(12) United States Patent
Black et al.

(10) Patent No.: US 7,794,819 B2
(45) Date of Patent: Sep. 14, 2010

(54) ELASTIC COMPOSITE

(75) Inventors: Kevin P. Black, Rock Hill, SC (US);
Dickie J. Brewer, Clover, SC (US);
Donald H. Lester, Jr., Waxhaw, NC
(US); Thierry Marche, La Chapelle
Basse Mer (FR)

(73) Assignee: Aplix, Inc., Charlotte, NC (US)

( * ) Notice: Subject to any disclaimer, the term of this patent is extended or adjusted under 35 U.S.C. 154(b) by 0 days.

(21) Appl. No.: 11/840,407

(22) Filed: Aug. 17, 2007

(65) Prior Publication Data

US 2008/0051748 A1 Feb. 28, 2008

Related U.S. Application Data

(60) Provisional application No. 60/839,998, filed on Aug. 24, 2006, provisional application No. 60/889,311, filed on Feb. 12, 2007.

(51) Int. Cl.
*B32B 5/04* (2006.01)
(52) U.S. Cl. .................. 428/189; 428/190; 428/194; 428/195.1; 428/198; 442/328; 442/329
(58) Field of Classification Search ................ 442/328, 442/329; 428/189, 190, 194, 195.1, 198; 156/163, 182
See application file for complete search history.

(56) References Cited

U.S. PATENT DOCUMENTS

| | | | |
|---|---|---|---|
| 3,800,796 A | 4/1974 | Jacob | |
| 4,525,407 A | 6/1985 | Ness | |
| 4,761,324 A | 8/1988 | Rautenberg et al. | |
| 4,795,456 A | 1/1989 | Borgers et al. | |
| 4,834,741 A | 5/1989 | Sabee | |
| 4,886,511 A | 12/1989 | Korpman | |
| 4,935,287 A | 6/1990 | Johnson et al. | |
| 4,978,570 A | 12/1990 | Heyn et al. | |
| 5,057,097 A | 10/1991 | Gesp | |
| 5,116,662 A * | 5/1992 | Morman ..................... 428/198 |
| 5,209,801 A | 5/1993 | Smith | |
| 5,236,430 A | 8/1993 | Bridges | |
| 5,393,599 A * | 2/1995 | Quantrille et al. ............. 442/57 |
| 5,422,172 A | 6/1995 | Wu | |
| 5,451,219 A | 9/1995 | Suzuki et al. | |
| 5,591,152 A | 1/1997 | Buell et al. | |
| 5,683,533 A | 11/1997 | Keighley et al. | |
| 5,683,787 A | 11/1997 | Boich et al. | |
| 5,763,041 A | 6/1998 | Leak et al. | |

(Continued)

FOREIGN PATENT DOCUMENTS

DE 4008674 9/1991

(Continued)

*Primary Examiner*—Elizabeth M Cole
(74) *Attorney, Agent, or Firm*—Hammer & Associates, P.C.

(57) ABSTRACT

An elastic composite includes a first nonwoven, a second nonwoven, and two elastic films sandwiched between the first and second nonwoven. The elastic composite also includes a lateral edge portion where the first nonwoven is bonded to the second nonwoven, a lane between the elastic films that is free of the elastic films, and a first bond joining the first nonwoven to the elastic film, and a second bond joining the second nonwoven to the elastic film. The elastic composite may be used as a component of a disposable garment.

20 Claims, 4 Drawing Sheets

U.S. PATENT DOCUMENTS

| | | | |
|---|---|---|---|
| 5,769,838 A | 6/1998 | Buell et al. | |
| 5,804,021 A | 9/1998 | Abuto et al. | |
| 5,882,769 A * | 3/1999 | McCormack et al. | 428/152 |
| 6,069,097 A * | 5/2000 | Suzuki et al. | 442/328 |
| 6,159,584 A | 12/2000 | Eaton et al. | |
| 6,221,483 B1 | 4/2001 | Hilston et al. | |
| 6,255,236 B1 | 7/2001 | Cree et al. | |
| 6,726,983 B2 | 4/2004 | Erdos et al. | |
| 6,967,178 B2 * | 11/2005 | Zhou et al. | 442/149 |
| 2003/0136497 A1 * | 7/2003 | Hamulski et al. | 156/73.1 |
| 2005/0287892 A1 | 12/2005 | Fouse et al. | |
| 2006/0292328 A1 * | 12/2006 | Baldauf et al. | 428/77 |
| 2007/0249254 A1 | 10/2007 | Mansfield | |

FOREIGN PATENT DOCUMENTS

| | | |
|---|---|---|
| EP | 0630631 | 6/1993 |
| EP | 094133 | 9/1999 |
| GB | 2016262 A | 9/1979 |
| WO | WO 9321879 | 11/1993 |

* cited by examiner though, that this invention is not limited to the
ELASTIC COMPOSITE

RELATED APPLICATIONS

This application claims the benefit of earlier-filed, co-pending U.S. Provisional application Nos. 60/839,998 filed Aug. 24, 2006 and 60/889,311 filed Feb. 12, 2007.

FIELD OF THE INVENTION

The instant invention is directed to an elastic composite for use in disposable garments, particularly as a side panel (or ear) or a tab of a disposable diaper.

BACKGROUND OF THE INVENTION

Disposable garments, for example diapers or training pants, are known. Such garments may have side panels (or ears) and/or tabs. The side panels and/or tabs may be made from elastic composites. Elastic composites typically comprise various combinations of nonwovens and elastic materials, each combination designed to obtain a specific solution to a particular problem. Often, these elastic composites require some type of mechanical work to activate the composite.

Examples of elastic composites (also known as elastic laminates) may be found in U.S. Pat. Nos. 6,255,236 and 6,726,983. U.S. Pat. No. 6,255,236 discloses an elastic laminate where two nonwovens sandwich an elastic web, and the laminate has at least one elastic lane and at least one stiffened lane. U.S. Pat. No. 6,726,983 discloses an elastic laminate where two nonwovens sandwich an elastic film, and the elastic film is extrusion coated onto one nonwoven and is thermally bonded to the other nonwoven.

There is an on-going effort in the disposable garment industry to provide new elastic composites with a balance of physical and esthetic properties and cost. Accordingly, there is a need for new elastic composites.

SUMMARY OF THE INVENTION

An elastic composite includes a first nonwoven, a second nonwoven, and two elastic films sandwiched between the first and second nonwovens. The elastic composite also includes a lateral edge portion where the first nonwoven is bonded to the second nonwoven, a lane between the elastic films that is free of the elastic films, and a first bond joining the first nonwoven to the elastic films, and a second bond joining the second nonwoven to the elastic films. The elastic composite may be used as a component of a disposable garment.

DESCRIPTION OF THE DRAWINGS

For the purpose of illustrating the invention, there is shown in the drawings a form that is presently preferred; it being understood, however, that this invention is not limited to the precise arrangements and instrumentalities shown.

DESCRIPTION OF THE INVENTION

Figure 1:
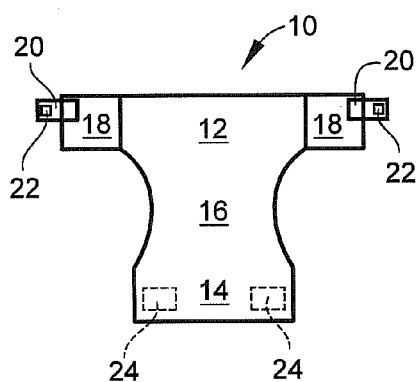
FIG. 1 is a schematic illustration of a representative disposable garment, e.g., a diaper.
Figure 2:
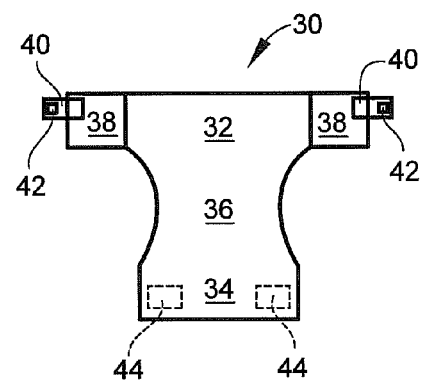
FIG. 2 is a schematic illustration of a second representative disposable garment, e.g., a diaper.

Referring to the drawings, wherein like elements have like numerals, there is shown in FIGS. 1 and 2 representative disposable garments, diapers 10 and 30.

In FIG. 1, diaper 10 generally comprises a rear waist portion 12, a front waist portion 14, and an interconnecting portion 16. At the lateral edges of the rear waist portion 12, there are affixed side panels (or ears) 18. At the distal ends of the side panels 18, tabs 20 may be affixed thereto. At the distal ends of tab 20, fastening device 22 may be affixed thereto. On the exterior surface of front waist portion 14, a mating fastening device 24 may be disposed (shown as two elements, but may be a continuous element). Fastening device 22 and mating fastening device 24 co-operate to releasably secure diaper 10 about a wearer, as is well known. Fastening device 22 and mating fastening device 24 may be any known fastening mechanism. Such known fastening mechanisms include, but are not limited to, hook and loop fasteners and adhesive fasteners. In diaper 10, side panels 18 may be elastic (e.g., stretchable in a direction away from rear waist portion 12), so that the diaper may be securely fit to the wearer, and tabs 20 may be non-elastic.

In FIG. 2, diaper 30 generally comprises a rear waist portion 32, a front waist portion 34, and an interconnecting portion 36. At the lateral edges of the rear waist portion 32, there are affixed side panels (or ears) 38. At the distal ends of the side panels 38, tabs 40 may be affixed thereto. At the distal ends of tab 40, fastening device 42 may be affixed thereto. On the exterior surface of front waist portion 34, a mating fastening device 44 may be disposed (shown as two elements, but may be a continuous element). Fastening device 42 and mating fastening device 44 co-operate to releasably secure diaper 30 about a wearer, as is well known. Fastening device 42 and mating fastening device 44 may be any known fastening mechanism. Such known fastening mechanisms include, but are not limited to, hook and loop fasteners and adhesive fasteners. In diaper 30, side panels 18 may be non-elastic, and tabs 20 may be elastic (e.g., stretchable in a direction away from rear waist portion 32), so that the diaper may be securely fit to the wearer.

Figure 3:
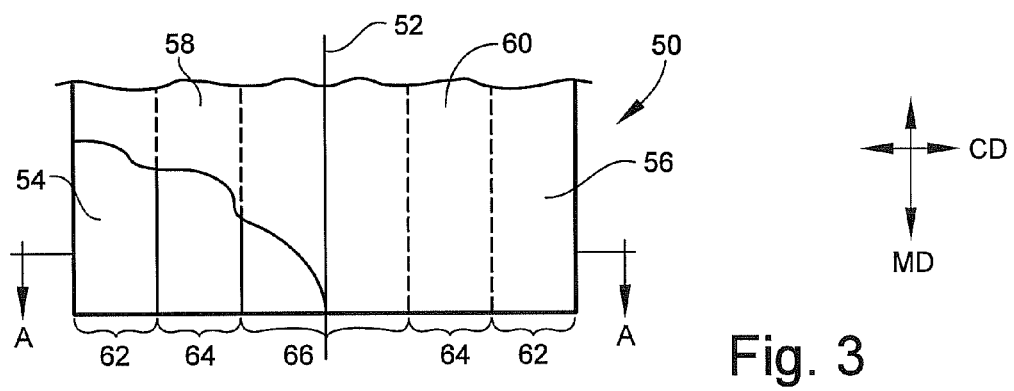
FIG. 3 is a top plan view of an embodiment of the instant invention, parts broken away for clarity.

Referring to FIG. 3, the instant invention, an elastic composite 50, is shown. Elastic composite 50 generally comprises a first (or bottom) nonwoven 54, a second (or upper) nonwoven 56, and a first (or right) elastic film 58 and second (or left) elastic film 60 sandwiched between the first nonwoven 54 and second nonwoven 56. The elastic composite 50 generally comprises two lateral edge portions 62, two stretch zones 64 and a lane 66 (lane 66 is divided by a center line 52 which is shown for reference). In the lateral edge portion 62, the first nonwoven 54 and the second nonwoven 56 may be bonded together (discussed in greater detail below). In the stretch zone 64, the first and second nonwovens 54, 56 may be bonded to the upper and lower surfaces of the elastic films 58, 60 (discussed in greater detail below).

The first and second nonwovens 54, 56 may be identical materials. These nonwovens may be any nonwoven. In one embodiment, the nonwoven has a basis weight in the range of 10-40 g/m², and in another embodiment, in the range of 22-30 g/m². The nonwoven, in one embodiment, is inelastic and highly extensible in the cross machine direction (CD). In one embodiment, the nonwoven has a CD extension at peak load of at least 200%. These nonwovens may be further characterized, in another embodiment, by their CD/MD (CD-cross machine or transverse direction; MD-machine direction) elongation ratio which may be at least 1:1, or at least 3:1, or in the range of 3-6:1, or in the range of 4-5:1. In one embodiment, the nonwoven is a point-bonded, carded nonwoven or spunlaced nonwoven produced from staple fibers. The staple fibers may be any material, for example, polyester (e.g., PET), polyolefin (e.g., PP), or a blend of both. The nonwoven may have apertures. An example of the point-bonded carded nonwoven is FPN 571D available from Fiberweb of Simpsonville, S.C. or SAWABOND 4132 (22 g/m²) from Sandler AG of Schwarzenbach, Germany. An example of the spunlaced nonwoven is SAWATEX® 2628 available from Sandler AG of Schwarzenbach, Germany.

The elastic films 58, 60 are, in one embodiment, identical to one another. The elastic films may be made from any elastomeric polymer. In one embodiment, the elastomeric polymers may be styrenic block copolymers. Styrenic block copolymers include, but are not limited to, SIS (styrene-isoprene-styrene) block copolymers, SBS (styrene-butene-styrene) block copolymers, and combinations thereof. The elastic film may have a basis weight, in one embodiment, of 40-100 g/m², and in another, 50-70 g/m². The elastic film may be further characterized by CD elongation of at least 200%.

The adhesive used in the bonding discussed above may be any adhesive. In one embodiment, the adhesive is a hot melt, non-elastic adhesive. Alternatively, adhesive may be replaced with bonding (e.g., thermal, ultrasonic, and/or infrared with or without binder fibers in the nonwoven).

The instant invention, elastic composite 50, shall be discussed in further detail below with regard to the embodiments shown in FIGS. 4-8.

Figure 4:
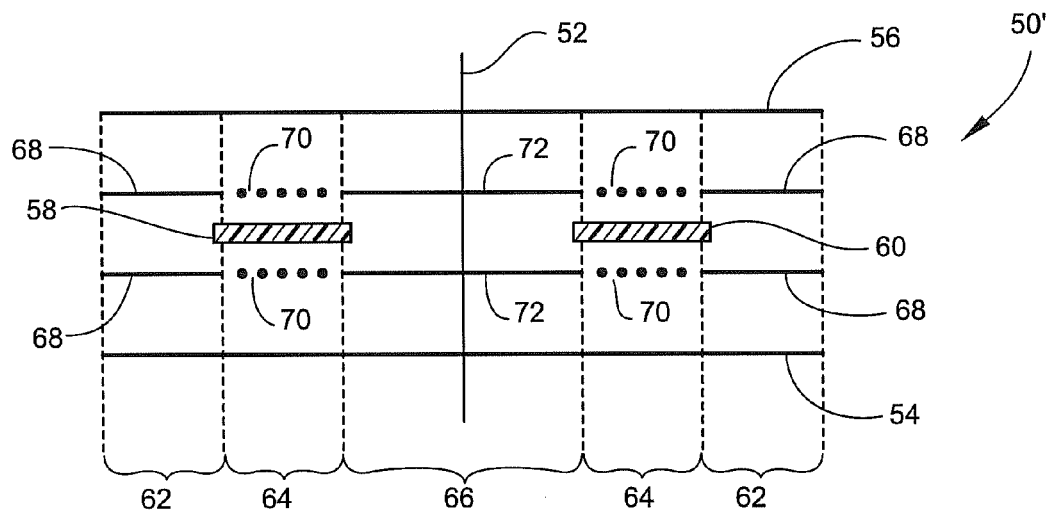
FIG. 4 is an exploded sectional view of a first embodiment of the instant invention taken along sectional lines A-A of FIG. 3.

In FIG. 4, elastic composite 50' is shown. In lateral edge portions 62, the first nonwoven 54 and the second nonwoven 56 are bonded together via lateral edge bonds 68. The lateral edge bonds 68 are formed from the adhesive discussed above. While in each lateral edge portion 62 there is shown two layers of adhesive (forming bonds 68), the invention is not so limited and, for example, a single layer of adhesive (applied to either nonwoven) may be used. Lateral edge bonds 68, in one embodiment, may be a continuous layer of adhesive (i.e., the adhesive covers the length and width of the lateral edge portions), whereby the nonwovens, which are inelastic but extensible, are generally fixed (i.e., prevented or substantially prevented from extension). Lateral edge bonds 68, in another embodiment, may be in the form of a grid or cross-hatching of lines of adhesive, or any other pattern intended to generally fix the nonwovens in the lateral edge portions 62. In one embodiment where the width of the elastic composite is 170 mm, the adhesive weight of the lateral edge bonds 68 is 8-9 g/m².

Likewise, in lane 66, the first nonwoven 54 and the second nonwoven 56 are bonded together via lane bonds 72. The lane bonds 72 are formed from the adhesive discussed above. While in lane 66 there is shown two layers of adhesive (forming bonds 72), the invention is not so limited and, for example, a single layer of adhesive (applied to either nonwoven) may be used. Lane bonds 72, in one embodiment, may be a continuous layer of adhesive (i.e., the adhesive covers the length and width of the lane), whereby the nonwovens, which are inelastic but extensible, are generally fixed (i.e., prevented or substantially prevented from extension). Lane bonds 72, in another embodiment, may be in the form of a grid or cross-hatching of lines of adhesive, or any other pattern intended to generally fix the nonwovens in the lane portion 66. In one embodiment where the width of the elastic composite is 170 mm, the adhesive weight of the lane bond 78 is 2-3.2 g/m².

In stretch zones 64, the first nonwoven 54 and the second nonwoven 56 are bonded to elastic films 58, 60 via stretch zone bonds 70. The stretch zone bonds 70 are located between the first nonwoven 54 and the elastic films 58, 60, and between the second nonwoven 56 and the elastic films 58, 60, as shown. The stretch zone bonds 70 are formed from the adhesive discussed above. The stretch zone bond 70 consists of a plurality of adhesive bonds, whereby when the elastic composite is stretched in the CD, the nonwoven may extend with the elastic film, and when the elastic composite is relaxed, the nonwoven may bulk. The stretch zone bonds 70, in one embodiment, may be a plurality of continuous lines of adhesive extending in the MD (in the drawing, this is illustrated by a horizontal line of dots). The stretch zone bond 70, in another embodiment, may be a plurality of discontinuous (e.g., dots) lines of adhesive extending in the MD (in the drawing, this is illustrated by a horizontal line of dots). The elastic films 58, 60 may extend to the lateral edges of the stretch zone 64 or may extend slightly over the lateral edges of the stretch zone 64. Instead of lines of adhesive, a continuous film of adhesive of various weights/volumes/densities of adhesives may be used (e.g., a pattern of high density adhesive lines with lower densities there between). In one embodiment, the lines of adhesive may have a width in the range of 0.5-1.0 mm or 0.5-0.55 mm. In one embodiment, the center-to-center line of adhesive spacing may be in the range of 2.0-2.5 mm.

Figure 5:
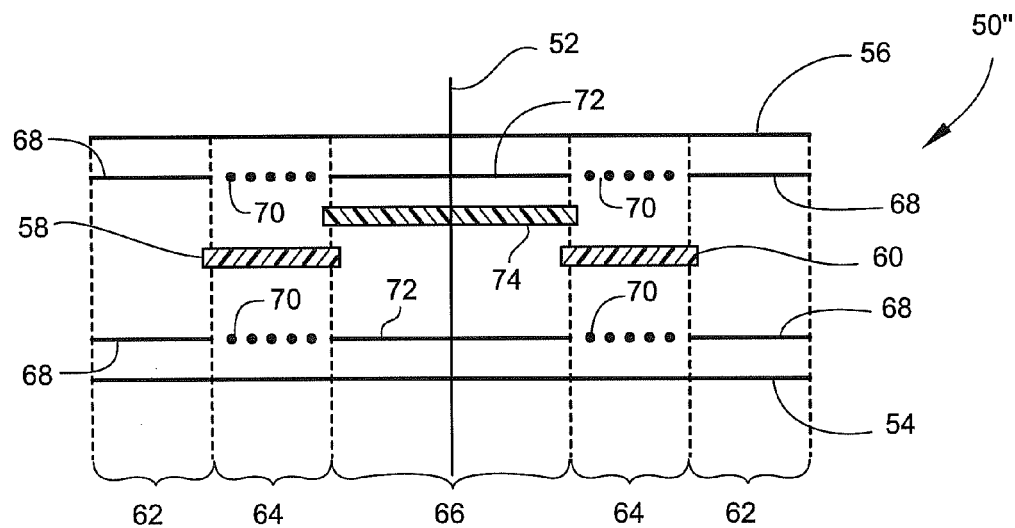
FIG. 5 is an exploded sectional view of a second embodiment of the instant invention taken along sectional lines A-A of FIG. 3.

In FIG. 5, elastic composite 50" is shown. Elastic composite 50" is the same as elastic composite 50' (of FIG. 4), except as follows. A stiffener 74 is added to lane 66 between the first nonwoven 54 and the second nonwoven 56. Stiffener 74 is added to provide additional mechanical strength to lane 66. Lane 66 may be the portion of the elastic composite that is affixed to the disposable garment or the fastener may be affixed thereto, and as such may require additional mechanical strength to facilitate attachment to the garment in assembly of the garment and/or use of the garment. Stiffener 74 is bonded to the first nonwoven 54 and the second nonwoven 56 via lane bonds 72, as discussed above. Stiffener 74 is a non-extensible material (non-extensible with regard to the elastic films 58, 60). Stiffener 74 may be a film or nonwoven. In elastic composite 50", stiffener 74 extends slightly beyond the lateral edges of lane 66 and overlaps (but may not be bonded thereto) the elastic films 58, 60.

Figure 6:
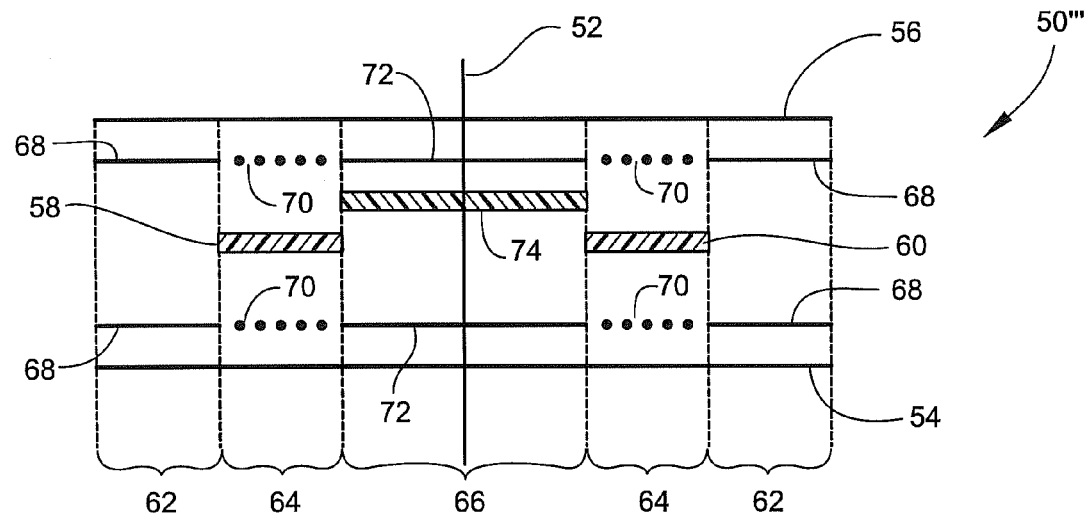
FIG. 6 is an exploded sectional view of a third embodiment of the instant invention taken along sectional lines A-A of FIG. 3.

In FIG. 6, elastic composite 50''' is shown. Elastic composite 50''' is the same as elastic composite 50" (of FIG. 5), except as follows. Stiffener 74 does not overlap elastic films 58, 60, and when the elastic composite 50''' is assembled, the lateral edges of stiffener 74 are adjacent to or abut with their respective lateral edge of the elastic films.

Figure 7:
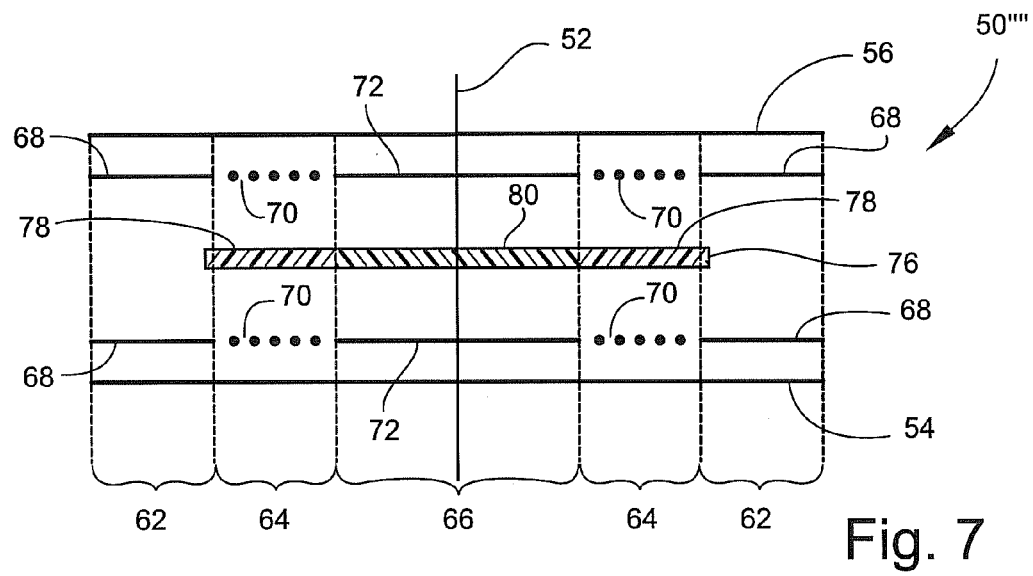
FIG. 7 is an exploded sectional view of a fourth embodiment of the instant invention taken along sectional lines A-A of FIG. 3.

In FIG. 7, elastic composite 50'''' is shown. Elastic composite 50'''' is the same as elastic composite 50' (of FIG. 4), except as follows. In elastic composite 50'''', elastic films 58, 60 are replaced with film 76. Film 76 has three zones, two lateral stretch portions 78 (corresponding to the stretch zones 64) and a center portion 80 therebetween (corresponding to lane 66). The lateral stretch portions 78 are elastic and the center portion 80 is inelastic. Film 76 is a unitary material and may be made by co-extrusion.

Figure 8:
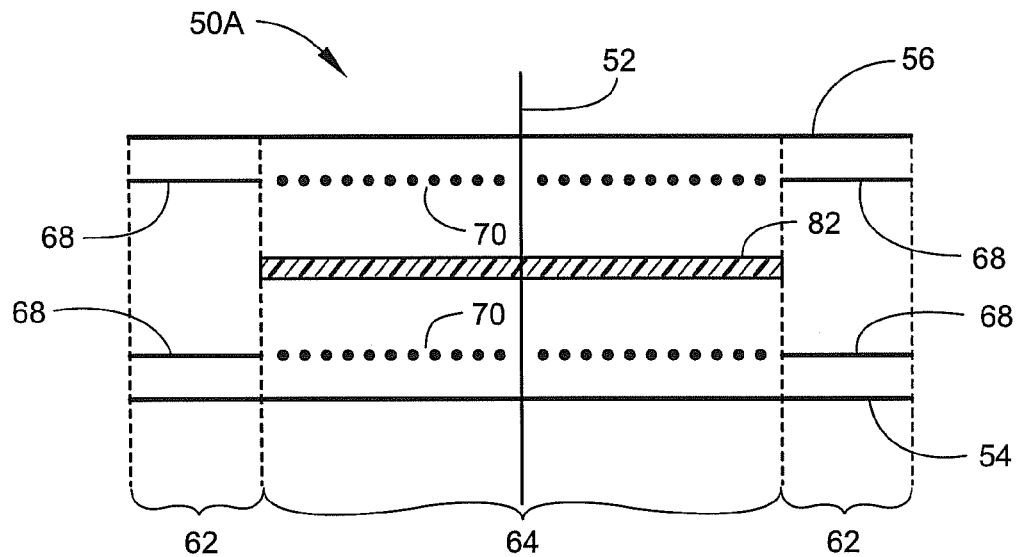
FIG. 8 is an exploded sectional view of a fifth embodiment of the instant invention taken along sectional lines A-A of FIG. 3.

In FIG. 8, elastic composite 50A is shown. Elastic composite 50A is similar to the foregoing elastic composites, except as follows. Elastic composite 50A has no lane 66. Instead, elastic composite 50A includes elastic film 82 (same materials of construction as prior elastic films) which may be adhered to the first nonwoven 54 and second nonwoven 56 via stretch zone bonds 70, as shown. Elastic composite 50A consists of two lateral edge portions 62 and an intermediate stretch zone 64.

Figure 9:
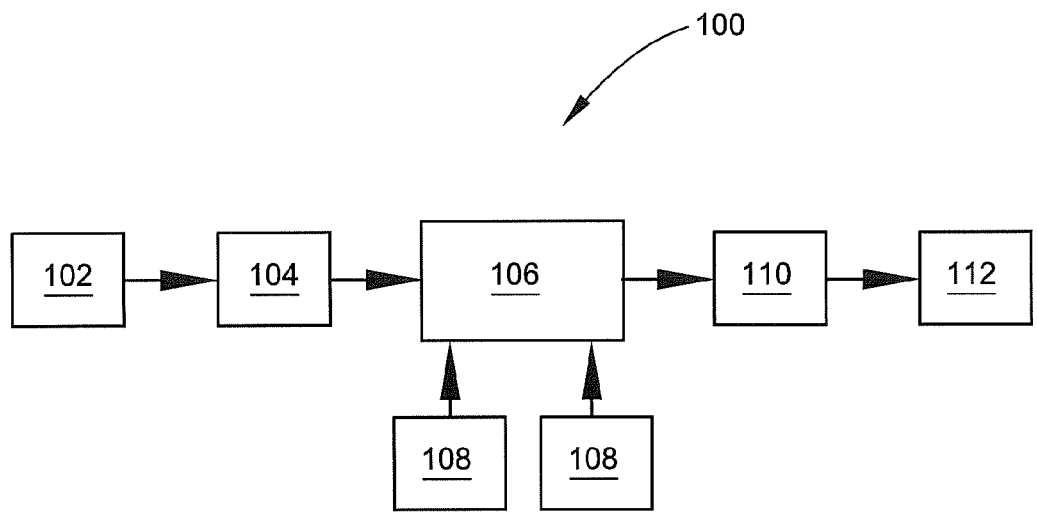
FIG. 9 is a schematic illustration of a process for making the instant invention.

Referring to FIG. 9, a process 100 for making elastic composite 50 is illustrated. In extrusion step 102, the elastic films 58, 60 or film 76 is made from polymeric resins in to the extruded material. In cooling step 104, the extruded material is cooled and solidified. In laminating step 106, elastic films 58, 60 or film 76 (and/or stiffener 74 as needed) are laminated between nonwovens 54, 56 (nonwovens 54, 56 being provided from supplies 108). Typically, there is no tension in the laminator (except for the slight tensions necessary to move the films and nonwovens therethrough). Optionally, however, a tension (in the MD) may be added to 'neck down' the nonwoven prior to lamination to the film. In stiffening step 110, lane 66 (and/or lateral edge portions 62) may be subject to calendering (either heated or nonheated rollers) to ensure firm bonding therein. Finally, in take-up step 112, the elastic composite 50 may be subjected to inspection, edge trim, winding up, and/or packaging.

When used in the disposable garment, the elastic composite may be cut along center line 52; so that one portion may be used on the right side of the garment and the other portion may be used on the left side of the garment. When elastic composite 50 is used as a side panel (or ear), the elastic composite should have a CD elongation of at least 140%. When the elastic composite 50 is used as a tab, the elastic composite should have a CD elongation of at least 35% (to obtain this elongation, it may be necessary to use a continuous adhesive layer for stretch zone bonds 70). The lane portion of the elastic composite is used to fasten the elastic composite to the garment.

The present invention may be embodied in other forms without departing from the spirit and the essential attributes thereof, and, accordingly, reference should be made to the appended claims, rather than to the foregoing specification, as indicated the scope of the invention.

We claim:

1. An elastic composite comprising:
   a first nonwoven, said first nonwoven being extensible, but inelastic, said first nonwoven having a CD extension at peak load of at least 200%, said first nonwoven being further characterized by a CD/MD elongation ratio of at least 3:1, said first nonwoven being a point-bonded carded nonwoven made of staple fibers or a spunlaced nonwoven, said first nonwoven having a basis weight in the range of 10-40 g/m$^2$,
   a second nonwoven, said second nonwoven being extensible, but inelastic, said second nonwoven having a CD extension at peak load of at least 200%, said second nonwoven being further characterized by a CD/MD elongation ratio of at least 3:1, said second nonwoven being a point-bonded carded nonwoven made of staple fibers or a spunlaced nonwoven, said second nonwoven having a basis weight in the range of 10-40 g/m$^2$,
   a first elastic film and a second elastic film, said first elastic film and said second elastic film being laterally spaced apart from one another and sandwiched between said first nonwoven and said second nonwoven, said first elastic film and said second elastic film being bonded to said first nonwoven and said second nonwoven, respectively, by a plurality of continuous lines of a hot melt adhesive extending in the MD direction when said first elastic film and said second elastic film being non-tensioned,
   a non-extensible material between said first elastic film and said second elastic film and being sandwiched between and bonded to said first nonwoven and said second nonwoven,
   whereby when the elastic composite is stretched in the CD direction, said nonwovens extend with said elastic films and when the elastic composite is relaxed, said nonwovens bulk.

2. The elastic composite of claim 1 wherein said CD/MD elongation ratio being in the range of 4-5:1.

3. The elastic composite according to claim 1 wherein said first nonwoven or said second nonwoven being a spunlaced nonwoven.

4. The elastic composite according to claim 1 wherein said first elastic film or said second elastic film or both comprising a styrenic block co-polymer.

5. The elastic composite according to claim 1 wherein said first elastic film or said second elastic film or both having a basis weight in the range of 50-70 g/m$^2$.

6. The elastic composite according to claim 1 wherein said first elastic film or said second elastic film or both being characterized by a CD elongation of at least 200%.

7. The elastic composite according to claim 1 wherein said hot melt adhesive being a non-elastic adhesive.

8. The elastic composite according to claim 1 wherein a line of said plurality of continuous lines having a width in the range of 0.5-1.0 mm.

9. The elastic composite according to claim 1 wherein a line of said plurality of continuous lines having a width in the range of 0.5-0.55 mm.

10. The elastic composite according to claim 1 wherein a center-to-center spacing of said plurality of continuous lines being in the range of 2.0-2.5 mm.

11. An elastic composite comprising:
    a first nonwoven, said first nonwoven being extensible, but inelastic, said first nonwoven having a CD extension at peak load of at least 200%, said first nonwoven being further characterized by a CD/MD elongation ratio of at least 3:1, said first nonwoven being a point-bonded carded nonwoven made of staple fibers or a spunlaced nonwoven, said first nonwoven having a basis weight in the range of 10-40 g/m$^2$,
    a second nonwoven, said second nonwoven being extensible, but inelastic, said second nonwoven having a CD extension at peak load of at least 200%, said second nonwoven being further characterized by a CD/MD elongation ratio of at least 3:1, said second nonwoven being a point-bonded carded nonwoven made of staple fibers or a spunlaced nonwoven, said second nonwoven having a basis weight in the range of 10-40 g/m$^2$,
    a first elastic film and a second elastic film, said first elastic film and said second elastic film being laterally spaced apart from one another and sandwiched between said first nonwoven and said second nonwoven, said first elastic film and said second elastic film being bonded to said first nonwoven and said second nonwoven, respectively, by a plurality of continuous lines of a hot melt adhesive extending in the MD direction when said first elastic film and said second elastic film being non-tensioned, a non-extensible material between said first elastic film and said second elastic film and being sandwiched between said first nonwoven and said second nonwoven and bonded to said first nonwoven and said second nonwoven with a hot melt adhesive, whereby when the elastic composite is stretched in the CD direction, said nonwovens extend with said elastic films and when the elastic composite is relaxed, said nonwovens bulk.

12. The elastic composite of claim 11 wherein said CD/MD elongation ratio being in the range of 4-5:1.

13. The elastic composite according to claim 11 wherein said first nonwoven or said second nonwoven being a spunlaced nonwoven.

14. The elastic composite according to claim 11 wherein said first elastic film or said second elastic film or both comprising a styrenic block co-polymer.

15. The elastic composite according to claim 11 wherein said first elastic film or said second elastic film or both having a basis weight in the range of 50-70 $g/m^2$.

16. The elastic composite according to claim 11 wherein said first elastic film or said second elastic film or both being characterized by a CD elongation of at least 200.

17. The elastic composite according to claim 11 wherein said each hot melt adhesive being a non-elastic adhesive.

18. The elastic composite according to claim 11 wherein a line of said plurality of continuous lines having a width in the range of 0.5-1.0 mm.

19. The elastic composite according to claim 11 wherein a line of said plurality of continuous lines having a width in the range of 0.5-0.55 mm.

20. The elastic composite according to claim 11 wherein a center-to-center spacing of said plurality of continuous lines being in the range of 2.0-2.5 mm.

* * * * *